Dec. 9, 1969  R. KORPMAN  3,483,017
METHOD OF UNIFYING BIBULOUS PAPERS
Filed May 9, 1966
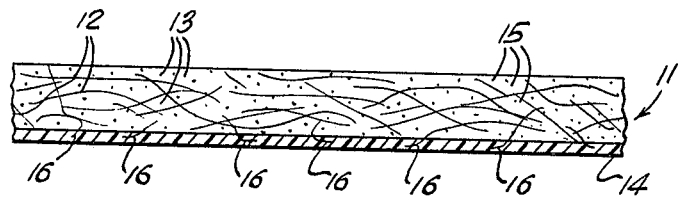
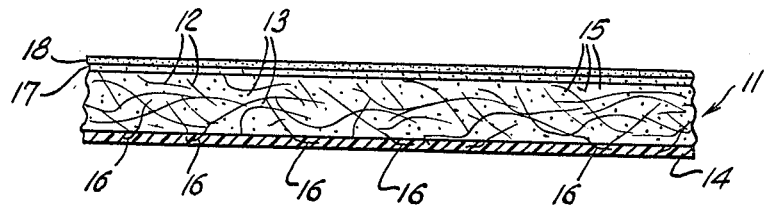
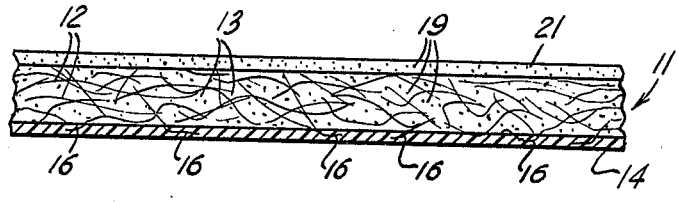
INVENTOR.
RALF KORPMAN
BY
ATTORNEY

United States Patent Office 3,483,017
Patented Dec. 9, 1969

3,483,017
METHOD OF UNIFYING BIBULOUS PAPERS
Ralf Korpman, East Brunswick, N.J., assignor to Johnson & Johnson, a corporation of New Jersey
Filed May 9, 1966, Ser. No. 548,627
Int. Cl. B44d 1/14; C08c 17/16
U.S. Cl. 117—68                                    2 Claims

ABSTRACT OF THE DISCLOSURE

A method of unifying a sheet of overlapping interlacing fibers having a substantially continuous barrier layer mechanically adhered to the fibers on one surface of the sheet but penetrating only a minor proportion of the interstices of the sheet; which comprises coating the other surface of the sheet with a nonaqueous polymeric heat curable unifying composition which preferably first increases substantially in fluidity and then cures quickly at elevated temperatures and comprises a normally liquid synthetic diene polymer having a molecular weight of between about 500 and 4,000 and a substantial molar amount of hydroxyl or carboxyl reactive groups. The nonaqueous unifying composition also preferably comprises a heat curing aldehyde resin and an accelerator therefor. The unifying composition is dispersed throughout the remaining interstices of the sheet and cured in bonding relation with the fibers and the barrier layer by the application of heat to the coated sheet. Various unified paper sheets and tapes according to this invention also are disclosed.

---

The present invention relates to a method of producing unified paper suitable for use as a component in adhesive tape, abrasive sheet material, flocked laminates, and the like, and to unified paper products resulting from this method.

When the term "unified paper," or the like, is used herein it shall mean a normally open, porous, or bibulous paper layer of overlapping interlacing fibers defining a multiplicity of interstices between them, which has been "unified" by a flexible bonding material dispersed in the interstices in bonding relation with the fibers of the layer so as to increase the internal or cohesive strength of the resulting unified sheet.

Unified papers of this type normally have been produced by immersing the paper in an impregnating bath of the unifying material to saturate the sheet therewith. The impregnated sheet then is passed between pressure rolls, or similarly treated, to meter the amount of impregnant remaining in the sheet and force it to penetrate the interstices of the paper. A somewhat different approach is proposed in United States Letters Patent No. 2,253,922 wherein a barrier layer first is applied in several coats to one surface of the paper in such a way that it does not penetrate the sheet to any appreciable extent and then is cured in situ. Thereafter, an aqueous impregnant in the form of a rubber latex is coated on the other surface of the paper and pressed into the sheet by a conventional technique. Finally, heat is applied to drive off the water and vulcanize the rubber. This process has two very decided disadvantages, i.e., the sheet distorts during processing and poor bonding results between the latex and the barrier coat. The paper is distorted due to the fact that one of its surfaces is fixed in position through adherence to the barrier layer and the other is caused to swell appreciably when contacted by the water of the latex. The effect of this distortion cannot be removed merely by squeezing the sheet after application of the latex. Satisfactory bonding cannot be attained between the latex and the barrier layer because of the amount of water which must be included in the latex to provide any kind of penetration through only one surface of the sheet and because a large amount of air is trapped in the voids of the sheet.

According to the present invention, a nonaqueous polymeric heat curable unifying composition, which preferably is based upon a fast curing normally liquid synthetic polymer, is distributed throughout the remaining voids or interstices of the paper through the surface of the sheet opposite to that of the barrier layer and then heat cured in situ, with the result that the paper is not distorted in any way and excellent bonding is attained between the unifying composition and the barrier layer. Preferably, the polymeric unifying composition is one that first increases substantially in fluidity and then cures quickly, at elevated temperatures. Thus, it may be applied to the surface of the sheet in a somewhat viscous normally liquid form and then heated to further liquify the composition and cause it to flow into the remaining interstices of the sheet and into contact with the inside surface of the barrier layer. Preferably, the liquid polymer is of the type which increases substantially in fluidity (in two or three seconds) to a viscosity below about 10,000 centipoises when heated to a temperature within the range of approximately 100–120° F. and, of course, would continue to increase in fluidity at a more gradual rate, as the curing temperature for the polymer is approached. When such a polymer is used, the unifying composition flows quickly throughout the sheet, when heated to an elevated temperature, and into contact with the barrier layer before the composition cures to any appreciable extent.

Preferably, the unifying composition of this invention comprises a normally liquid synthetic diene polymer having a molecular weight of between about 500 and 4,000 and a substantial molar percentage of hydroxyl or carboxyl reactive groups, and aldehyde heat curing constituents dispersed in the liquid of said polymer. The heat curing constituents comprise an oil soluble diene-polymer-reactive heat-curing aldehyde resin, and may include a compatible accelerator for said resin. Similarly, at least a small amount of solvent normally is used for the heat curing constituents. This solvent must also be compatible with the liquid polymer. Conventional solvents, such as toluene and xylene, are suitable for this purpose as well as for controlling the amount of polymer to be deposited from the unifying composition for a given application. This unifying composition cures quite rapidly, i.e., within about four minutes at no more than about 350° F., and considerably more rapidly at higher temperatures.

When the phrase "a substantial molar amount" is used herein in conjunction with the number of hydroxyl or carboxyl reactive groups per mol of the above-described synthetic diene polymer, it means an amount of said reactive groups necessary to give a fast cure, i.e., within about four minutes, at no more than about 350° F., and generally shall mean an amount in the range of magnitude of about one-half to two and one-half reactive groups per mol of the liquid polymer, said reactive groups preferably being in the terminal position. The amount referred to is determined on the basis of the total number of hydroxyl and carboxyl groups per mol in cases where both types of reactive groups are present in the polymer. When no carboxyl reactive groups are present, the preferred molar amount is about two to two and one-half hydroxyl groups per mol. Unifying compositions based on diene polymers comprising a substantial molar amount of hydroxyl reactive groups presently are preferred since certain of these polymers are potentially relatively inexpensive and readily available, and therefore make possible additional reductions in the cost of manufacturing cured unified sheets according to this invention.

Generally speaking, the above-described reactive liquid polymeric unifying composition comprises about 20–150 parts by weight per hundred parts of the liquid polymer (p.p.h.l.p.) of the aldehyde curing resin, and about 0–150 (p.p.h.l.p.) of the compatible accelerator for the curing resin. Whenever the term "parts" is used hereinafter, it shall mean parts by weight per hundred parts of the liquid polymer (p.p.h.l.p.), unless otherwise specified. The necessary amounts of the aldehyde curing resin and the accelerator therefor will vary with the aldehyde resin used. For instance, at least 0.5 part of the compatible accelerator is deemed necessary when a phenol formaldehyde curing resin is used, whereas no accelerator is needed with certain urea formaldehyde or melamine formaldehyde curing resins. The following are the preferred ranges for the accelerators indicated when the unifying composition is based on a phenol aldehyde resin, i.e., zinc resinate, 15–150 parts; zinc oxide, 5–100 parts; para-toluene sulfonic acid, 0.5–5 parts; and stannous chloride, 0.5–5 parts.

As indicated hereinbefore, the normally liquid synthetic diene polymers of this invention are those which have a molecular weight of between about 500 and 4,000 and comprise a substantial molar percentage of hydroxyl or carboxyl reactive groups in the sense that this term has been defined herein. When the term diene polymer or polymers is used in this application, it shall mean conjugated diene polymers based on butadiene, isoprene, or the like; copolymers of these materials with one another; and copolymers of one or more of such materials with one or more other monomers such as acrylonitrile, styrene, or the like. Among the hydroxyl modified polymers which are useful in accordance with this invention are Poly B–D R15M, a butadiene polymer; Poly B–D CS–15, a butadiene-styrene polymer comprising approximately 75 percent butadiene and 25 percent styrene; and Poly B–D CN–15, a butadiene-acrylonitrile polymer comprising approximately 85 percent butadiene and 15 percent acrylonitrile; all of the above polymers being manufactured by Sinclair Petrochemicals, Inc. Each of the above polymers comprises approximately two to two and one-half hydroxyl reactive groups per mol. A typical carboxyl modified diene polymer according to this invention is Butarez CTL, a butadiene polymer manufactured by Phillips Chemicals and comprising approximately two carboxyl reactive groups per mol. A liquid diene polymer of this invention comprising both hydroxyl and carboxyl reactive groups is Poly B–D A35, a butadiene-styrene based polymer having a combined total of one reactive group per mol which in turn comprises in the order of one-half of a hydroxyl group and one-half of a carboxyl group. This polymer is manufactured by Sinclair Petrochemicals, Inc. Various other normally liquid synthetic diene polymers within the described range of molecular weight and comprising the specified molar percentage of hydroxyl and/or carboxyl reactive groups may be used in formulating the unifying composition of this invention.

The oil soluble diene-polymer-reactive heat-curing formaldehyde resins of this invention include phenol formaldehyde resins such as Amberol ST 137, an octyl phenol formaldehyde resin sold by Rohm and Haas Co.; nonyl phenol formaldehyde resins such as Resin B described in Examples I and II of U.S. Letters Patent No. 2,987,420; SP–1055 and 1056 Resins, bromo-methyl alkylated phenol formaldehyde resins sold by Schenectady Chemicals, Inc.; and the like. Certain oil soluble diene-polymer-reactive heat-curing urea and melamine formaldehyde resins of this invention such as Uformite F 226E, a urea formaldehyde resin supplied by Rohm and Haas Co.; and Resinene 875, a melamine formaldehyde resin sold by Monsanto Chemical Co.; cure so effectively that they may be used in accordance with this invention without employing an accelerator for the cure.

The barrier layer may be applied to the first surface of the paper sheet by coating it with a relatively high viscosity polymeric film forming composition which solidifies quickly at elevated temperatures and does not flow substantially further into the sheet when heated. Examples of film formers of this type are vinyl plastisols which fuse and jell at elevated temperatures, viscous heat curable synthetic diene polymer compositions, and the like. It also may be desirable to utilize a paper sheet having an extruded polymeric film or layer of a material such as polyethylene, polypropylene, or polyvinyl chloride on one of its surfaces, and then apply the unifying composition to the sheet through its other surface, as described above.

One of the main advantages of this invention is that the unifying composition may contain little or no solvent, i.e., it may consist essentially of the liquid polymer and the necessary heat curing constituents. As explained above, the polymer first will liquefy rapidly when heat is applied so that the unifying composition will flow into and throughout the web and enter into contact with the previously applied barrier layer. When only a small amount of solvent is used, say less than 30 percent by weight of the composition, preferably less than 10 percent, it evaporates almost instantaneously and leaves the fibers embedded in a polymeric matrix formed by the liquid polymer and its heat curing constituents.

In one form of the invention, the unifying composition is applied to the sheet in excess of the amount necessary to saturate or fill the remaining interstices thereof and thereby form an outer layer of the unifying composition or material beyond the fibers of the sheet on the paper surface opposite to that of the barrier layer. The thickness of this outer layer may be varied depending upon how it is to be used. For instance, a relatively thin outer layer of this type may be coated with a correspondingly thin layer of a normally tacky pressure-sensitive adhesive to form a pressure-sensitive sheet or tape, thereby saving adhesive which is the most expensive constituent of the tape. When the cured unifying composition possesses sufficient tack, the outer layer thereof may be made sufficiently thick that the outer layer, itself, may act as the pressure-sensitive adhesive layer of the sheet. This approach is particularly suitable for low tack pressure-sensitive adhesive sheets. Similarly, this form of the invention may be used in the production of abrasive sheet material, flocked laminates, and the like, wherein the abrasive particles, or block, are embedded in the aforesaid outer layer of unifying material or the outer layer acts as a base for a layer of sand-size, or the like, which is much thinner than usual, for retaining the particles. Various other laminated structures will suggest themselves.

Other and further advantages of the invention will appear to one skilled in the art from the following description and claims taken together with the drawings wherein dimensions have been exaggerated for the sake of clarity:

FIG. 1 is a very greatly enlarged schematic sectional view through a portion of a unified paper sheet according to one embodiment of this invention.

FIG. 2 is a similarly enlarged schematic sectional view of a unified paper sheet according to another embodiment of the invention.

FIG. 3 is a similar schematic sectional view through a unified sheet according to still a different embodiment of the invention.

Referring to FIG. 1 of the drawings, there is shown a unified paper sheet according to one embodiment of the invention, which comprises a normally bibulous paper layer 11 of overlapping interlacing fibers 12 defining a multiplicity of interstices 13 between them, a substantially continuous polymeric barrier layer 14 on one surface of the fibrous layer 11, and a polymeric unifying composition or material 15 substantially uniformly dispersed throughout the remaining interstices 13 of the fibrous layer. The barrier layer 14 is in the form of a substantially continuous film mechanically adhered to the fibers 16 adjacent one surface of the paper layer. However, the film forming composition, or barrier material, penetrates only a minor proportion of the interstices 13 of the fibrous layer so that the major proportion of the interstices 13 remain available to receive the unifying material. The unifying material 15, on the other hand, is dispersed throughout the remaining interstices of the sheet in bonding relation with the fibers 12 thereof and in direct bonding contact with the inside surface of the barrier layer 14. As a result, the unified fibers 12 of the sheet are secured firmly to the barrier layer 14 so that the sheet will not delaminate from, or adjacent to, the barrier layer when stripping forces are applied thereto. This sheet is suitable as a base for forming pressure-sensitive tape, abrasive sheet material, flocked laminates, and the like. This normally would be accomplished by applying an additional adhesive layer, not shown, to the surface of the sheet opopsite to that of the barrier layer. The adhesive would be pressure-sensitive to form a pressure-sensitive adhesive tape, or would be capable of retaining abrasive particles, flock or the like, if it is desired to form a structure of this type.

FIG. 2 illustrates a modification of FIG. 1 wherein the unifying composition 15 is applied to the fibrous layer 11 in excess of the amount necessary to saturate or fill up the remaining interstices 13 of the sheet so that a relatively thin outer layer 17 of the unifying material is formed beyond the fibers 12 of the sheet on the surface of the sheet opposite to that of the barrier layer 14. As described in connection with FIG. 1, the barrier layer 14 penetrates only a minor proportion of the interstices of the sheet and mechanically adheres to fibers 16 adjacent that surface of the sheet. A similar relatively thin final layer 18 of a normally tacky and pressure-sensitive adhesive then is applied over the outer layer 17 of the unifying material to form a pressure-sensitive sheet or tape. Since the normally tacky and pressure-sensitive adhesive is the most expensive constituent of this type of product, pressure-sensitive products according to this embodiment of the invention may be produced quite economically due to the minimum amount of adhesive which is required.

FIG. 3 illustrates a laminated structure according to this invention very similar to that of FIG. 2, but this time in the form of a low tack pressure-sensitive adhesive sheet comprising a unifying composition or material 19 which, in itself, possesses sufficient tack for use in forming certain products such as pressure-sensitive adhesive protective sheeting and the like. In this case, the unifying composition 19 is applied to the fibrous layer 11 in excess of the amount necessary to fill the remaining interstices 13 thereof, as explained in connection with FIG. 2, but this time to form a thicker outer layer 21 of the unifying material. This outer layer 21 then acts as the pressure-sensitive adhesive layer of the resulting unified sheet.

The invention will be further illustrated in greater detail by the following examples. It should be understood that although these examples may describe some of the more specific features of the invention, they are given only for the purpose of illustration and the invention should not be construed as limited thereto. Unless otherwise indicated, all parts given are parts by weight per hundred parts of the normally liquid synthetic diene polymer (p.p.h.l.p.), as stated hereinbefore.

The normallly liquid synthetic diene polymers used in the examples are listed in Table I, below.

TABLE I

| Liquid polymer | Material and manufacture | Number average molecular weight | Approximate No. of reactive groups per mol |
|---|---|---|---|
| A | Polybutadiene polymer (Sinclair Poly B-D R 15 M). | 3,421 | 2-2½ hydroxyl. |
| B | Butadiene-styrene polymer (Sinclair Poly B-D A 35). | 973 | 1 group comprising about ½ hydroxyl and ½ carboxyl. |
| C | Butadiene-styrene polymer (Sinclair Poly B-D CS-15). | 2,902 | 2-2½ hydroxyl. |
| D | Butadiene-acrylonitrile polymer (Sinclair Poly B-D CN-15). | 2,644 | Do. |
| E | Polybutadiene polymer (Phillips Butarez CTL). | 3,611 | 2 carboxyl. |

EXAMPLE I

A unified paper sheet of this invention is prepared from an open porous 28½ pound per ream semi-bleached, creped, saturating grade paper of overlapping interlacing fibers by first coating one surface of the paper with the following barrier formulation:

| Constituent | Parts | Percent by wgt. formulation |
|---|---|---|
| Vinyl chloride plastisol | 70 | |
| Lecithin | 7 | |
| Xylene | | 30 |

The above barrier formulation is coated on one surface of the sheet by a conventional device such as a half-round knife. The coated sheet is subjected to temperatures of 300° F. for 4.2 seconds, 325° F. for 4.2 seconds and 350° F. for 4.2 seconds, and 390° F. for 12.6 seconds to dry and fuse the plastisol and solidify the barrier layer. During this process, the barrier material does not flow substantially further into the sheet. The resulting dried barrier layer weighs approximately 4 oz./sq. yd. and is in the form of a substantially continuous film mechanically adhered to the fibers of the sheet but penetrating only a minor proportion of the interstices thereof. The following unifying composition then is coated onto the other surface of the sheet by the same technique in an amount designed to give a dried weight of the unifying material of approximately .7 oz./sq. yd.

| Constituent | Parts | Percent by wgt. composition |
|---|---|---|
| Polymer A | 100 | |
| Amberol ST-137 | 36 | |
| Zinc Resinate | 20 | |
| TiO₂ | 1 | |
| Toluene | | 50 |

The Amberol ST-137, referred to above and used hereinafter in the examples, is an octyl phenol formaldehyde resin made from the alkaline condensation of para tertiary octyl phenol and formaldehyde, and having a melting point of about 87° C. The sheet with the unifying composition coated thereon is then heated as described above in connection with the barrier formulation to the temperatures indicated to dry and cure the unifying material in elastomeric bonding relation with the fibers of the sheet. During this process, the unifying composition flows into the sheet so that it becomes dispersed substantially uniformly throughout the remaining interstices thereof and enters into bonding contact with the inner surface of the barrier layer. The surface of the unified sheet opposite to that of the barrier layer next is coated with the following pressure-sensitive adhesive formulation:

| Constituent | Parts | Percent by wgt. formulation |
|---|---|---|
| Pale crepe rubber | 100 | |
| Pentaerythritol ester of rosin | 95 | |
| Amberol ST-137 | 12 | |
| Zinc resinate | 10 | |
| 2,6 ditertiary butyl paracresol | 1 | |
| Detertiary amyl hydroquinone | 1 | |
| Toluene | | 70 | as described above and dried and cured for 11.6 seconds at 190° F., 11.6 seconds at 230° F., 11.6 seconds at 350° F., and 23.2 seconds at 360° F. The resulting dry pressure-sensitive adhesive layer weighs approximately 1.9 oz./sq. yd. The finished adhesive sheet is then slit to form tapes one inch wide and wound upon itself on paper cores in the usual manner to form rolls of pressure-sensitive adhesive tape having the following properties:

Tape properties

Longitudinal tensile strength ___ 20 lbs./in. width.
Percent elongation ___ 12.
Adhesion to steel ___ 30 oz./in. width.
Tack (quick stick) ___ Good.
Unwind adhesion ___ 15 oz./in. width at 50 ft./min.
High temperature stability ___ Excellent.

In addition, the tape and its unified sheet backing is free of distortion and possesses excellent delamination resistance.

EXAMPLE II

A pressure-sensitive adhesive tape is produced from a unified sheet according to this invention as described in Example I with the exception that the following barrier formulation and unifying composition are used:

BARRIER FORMULATION

| Constituent | Parts | Percent by wgt. formulation |
|---|---|---|
| SBR 1013 rubber | 100 | |
| Amberol ST-137 | 24 | |
| Zinc resinate | 25 | |
| Toluene | | 75 |

UNIFYING COMPOSITION

| Constituent | Parts | Percent by wgt. composition |
|---|---|---|
| Polymer B | 100 | |
| Amberol ST-137 | 120 | |
| Zinc resinate | 20 | |
| TiO$_2$ | 1 | |
| Toluene | | 50 |

The SBR 1013 Rubber used in the barrier formulation is a (57–43) butadiene-styrene polymer. The barrier formulation is sufficiently viscous that it does not flow substantially further into the sheet when heated, as described in Example I, and again forms a substantially continuous barrier layer mechanically adhered to the fibers of the sheet but penetrating only a minor proportion of its interstices, and the unifying composition flows into the remaining interstices of the sheet and enters into bonding relation with the fibers and inside surface of the barrier layer as described in Example I. When the resulting unified sheet is coated with the adhesive formulation of Example I, a similar satisfactory delamination resistant pressure-sensitive adhesive tape again is formed.

In addition, since the barrier layer resulting from the above formulation does not possess good release properties, per se, it is coated with a conventional release agent, such as described in United States Letters Patent No. 2,913,355, to provide satisfactory release properties when the resulting tape is wound upon itself to form a roll and then unwound for use.

EXAMPLE III

Another pressure-sensitive adhesive tape is formed from a unified paper sheet according to this invention as described in Example I, except that Polymer C is substituted for Polymer A and 100 parts of zinc resinate are used, instead of 20 parts, in the unifying composition. The unified sheet is free from distortion and the resulting pressure-sensitive adhesive tape possesses very satisfactory properties for a variety of uses.

EXAMPLE IV

A unified paper sheet of this invention is produced by first treating one surface of a 28½ pound per ream semibleached, creped, saturating grade paper with the barrier formulation of Example I in the manner described in that example. The resulting barrier coated sheet then is coated on the other side with the same unifying composition used in Example I with the exception that it contains only 22 percent toluene by weight of the composition. The unifying composition is applied to the sheet by a reverse roll technique, in excess of the amount necessary to saturate its remaining interstices, to form an outer layer of the unifying composition beyond the fibers thereof on the surface of the sheet opposite to the barrier layer. The unifying composition is substantially uniformly dispersed throughout the remaining interstices of the sheet and, after drying and curing as described in Example I, in heat cured and bonding relation with its fibers and with the inside surface of the barrier layer. The total weight of the cured unifying material, both inside the sheet and in the outer layer thereof, is approximately 1.4 oz./sq. yd. The cured outer layer of unifying material applied to the unified sheet of this example is normally tacky and pressure-sensitive to the extent that it is suitable for use as a low tack pressure-sensitive adhesive protective paper and for similar applications. The sheet itself is free from distortion and possesses high delamination resistance.

EXAMPLE V

A pressure-sensitive adhesive tape is made from the unified sheet of Example IV by coating the outer layer of unifying material thereof with the pressure-sensitive adhesive formulation of Example I at a dried coating weight of 1 oz./sq. yd. under the time and temperature conditions described in Example I. Since this tape requires only about one-half the amount of the pressure-sensitive adhesive formulation, as compared with Example I, a relatively inexpensive pressure-sensitive adhesive tape or sheet is formed by this technique. When this pressure-sensitive adhesive sheet is slit into one inch tapes and wound upon itself on paper cores, the resulting tapes possess the following properties:

Tape properties

Longitudinal tensile strength ___ 20 lb./in. width.
Tack (quick stick) ___ Very good.
Unwind adhesion ___ Very good.
Adhesion to steel ___ 25 oz./in. width.
Percent elongation ___ 13.

EXAMPLE VI

A unified paper sheet according to this invention is produced as described in Example IV, substituting Polymer D for Polymer A in the unifying composition, and applying the vinyl barrier formulation in such an amount that the resulting barrier film weighs approximately 2 oz./sq. yd. and possesses substantial thickness and good flexibility. The resulting unified sheet possesses quite satisfactory delamination resistance and is free from distortion during processing and in the resulting product. This unified sheet may be used as a low tack product as described in Example IV. It also possesses excellent overall strength, tear resistance and abrasion resistance (due mainly to the heavy vinyl barrier film) and therefore is particularly useful where these qualities are important.

EXAMPLE VII

Another unified sheet of this invention is made in accordance with Example IV utilizing the barrier formulation of Example II; and substituting Polymer E for Polymer A, 60 parts Amberol ST–137 curing resin and 35 parts of zinc resinate for the proportion used in Example IV, all in the unifying composition. The resulting sheet possesses excellent delamination resistance and is particularly adapted to receive a subsequent coat of a bonding adhesive for producing abrasive paper or a flocked laminate.

EXAMPLE VIII

A unified sheet of this invention is produced as described in Example VI, except that Polymer A is used in the unifying composition in lieu of Polymer D, and enough of the unifying composition is applied to the sheet so that the total weight of the cured unifying material (both inside the sheet and in the outer layer thereof) is about 2.2 oz./sq. yd. In addition, the unifying composition includes approximately 40 parts of a polymeric elastic solid tackifier sold by Velsicol Corporation as Stickvel P. This tackifier is believed to be the Friedel-Crafts polymerization product of still residue from commercial oil distillation high in indene and isoprene to which has been added butadiene and styrene and having a molecular weight within the range of about 500 to 2000, a melting point of about 125° F.–135° F. and an acid number of less than 1.

The resulting product is a pressure-sensitive adhesive sheet wherein a relatively thick outer layer of the unifying material is formed outside the fibers of the paper layer. The addition of the polymeric elastic solid tackifier gives the sheet somewhat higher tack and adhesive strength than that of Example VI. However, it still does not possess sufficient tack for many pressure-sensitive adhesive applications. The rectangular pieces of this sheet may be stacked one on top of the other to form a floor mat which is adapted to remove dust and lint from the feet of people entering a particular "clean" area such as a hospital operating room. In this application, the high tear and puncture resistance of the sheet is quite advantageous. As mentioned in connection with Example VI, these properties result to a large extent from the relatively thick and flexible polymeric barrier layer applied to the back of the paper sheet, and the bonding of this layer to the unifying material dispersed throughout the interstices of the fibrous layer of the sheet and integral with the outer adhesive layer of the same material.

The following examples of pressure-sensitive adhesive tapes according to this invention are produced as described in Example V utilizing different formaldehyde curing resins with and without accelerators and with Polymer A in the unifying composition and the solvents indicated in the following table in the below listed proportions:

| Example | Formaldehyde resin | Parts formaldehyde resin | Parts zinc resinate accelerator | Percent solvent by wgt. composition |
|---|---|---|---|---|
| IX | Ethyl resin 78 | 36 | 20 | 22 (toluene). |
| X | Nonylphenol formaldehyde resin. | 40 | 20 | 22.3 (toluene). |
| XI | Schenectady SP-1055 resin. | 40 | | 22.2 (toluene). |
| XII | Uformite F 226E | 10 | | 8.3 (capryl alcohol and butanol). |
| XIII | Resimene 875 | 30 | | 18.7 (butanol and xylol). |

In the foregoing examples, Ethyl Resin 78 is a heat reactive phenol formaldehyde resin prepared from orthotertiary-butylphenol with a softening point of 120° C. (determined by the ball and ring method).

The nonyl phenol formaldehyde resin is made in a one liter flask equipped with a reflux condenser and decanter. 220.0 g. of nonyl phenol (1 mol) is charged into the flask. 49.5 parts of a 91 percent paraformaldehyde (1.5 mols) is added and 11.0 parts of a 20 percent NaOH solution (0.55 mol) is finally added. The mix is heated and stirred at 90° for 2 hours. Then 126.3 g. toluene is added and the solution is azeotroped for approximately 2 hours. The final solution viscosity is "J" on the Gardner-Holdt scale (25° C.). This resin has a softening range of 46–82° C. as measured on the Kofler Heizbank melting point apparatus.

Schenectady SP–1055 Resin is a heat-reactive, bromomethyl alkylated, phenol-formaldehyde resin having a specific gravity of 1.05 and a melting point of 135° F. (Capillary Tube Method). No additional accelerator is used with this resin since it contains its own accelerator. It is believed that hydrogen bromide is formed when the agglutinant is mixed and heated and that this material acts as an acid accelerator in the curing of the agglutinant.

Uformite F 226E is a urea formaldehyde resin dissolved at 50 percent solids in a mixture of capryl alcohol and butanol and having a specific gravity of 0.98 and a Gardner-Holdt viscosity of W–Z.

Resimene 875 is a melamine formaldehyde resin dissolved at 50 percent solids in a 1:1 mixture of butanol and xylol and having a specific gravity of 0.991–1.002 and a Gardner-Holdt viscosity of L–P.

In all of the above Examples IX–XIII, the resulting pressure-sensitive adhesive tapes are flexible and free from distortion and possess good delamination resistance.

The following additional examples of pressure-sensitive adhesive tapes according to this invention are produced as described in Example V with the exception that the following acid accelerators are used in lieu of zinc resinate in the proportions indicated in the unifying composition of Example V, with approximately 24 parts of the Amberol ST–137 curing resin and the present toluene listed below:

| Example | Accelerator | Parts accelerator | Percent toluene by wgt. composition |
|---|---|---|---|
| XIV | Toluene sulfonic acid in 50% isopropyl alcohol. | .5 | 15.7 |
| XV | do | 1.0 | 19.4 |
| XVI | Stannous chloride | 2 | 17.3 |
| XVII | do | 1 | 17.3 |

The unifying compositions of Examples XIV to XVII cure very rapidly, say in a fraction of a second, at approximately 350° F. so that they are particularly advantageous when they can be coated and cured directly after mixing the accelerator with the other constituents of the unifying composition.

In the foregoing examples, IV through XVII, the unifying composition may be coated onto the surface of the sheet opposite to that of the barrier layer in a fairly viscous state which allows it to be metered accurately onto the surface of the sheet. The sheet which has been coated in this manner, then is subjected to the elevated temperatures indicated in the examples to rapidly remove any solvent and cause the unifying composition first to increase in fluidity and flow into the remaining interstices of the sheet and into contact with the inside surface of the barrier layer so as to become substantially uniformly dispersed throughout these interstices and, then, to cure quickly in bonding relation with the fibers of the sheet and the barrier layer. The fact that the unifying composition first increases substantially in fluidity and then cures quickly at elevated temperatures is thought to be due mainly to the fact that the normally liquid polymer on which the composition is based also possesses these qualities. For instance, as indicated hereinbefore, it is preferred that the liquid polymer be of the type which increases substantially in fluidity to a viscosity below about 10,000 centipoises when heated to a temperature at least within the range of approximately 100–120° F. The following table illustrates the viscosity properties of one of these polymers:

Viscosity of Polymer A

| Viscosity centipoises: | Temperature, degrees F. |
|---|---|
| 22,500 | 80 |
| 8,500 | 90 |
| 8,000 | 100 |
| 6,400 | 110 |
| 5,500 | 120 |

Having now described the invention in specific detail and exemplified the manner in which it may be carried into practice, it will be readily apparent to those skilled in the art that innumerable variations, applications, modifications, and extensions of the basic principles involved may be made without departing from its spirit or scope.

What is claimed is:

1. The method of unifying a bibulous paper sheet of overlapping interlacing fibers defining a multiplicity of interstices between them and having on one surface of the sheet a substantially continuous barrier layer mechanically adhered to the fibers of the sheet but penetrating only a minor proportion of the interstices thereof; which comprises coating the other surface of the sheet with a nonaqueous polymeric heat curable unifying composition which comprises a normally liquid synthetic diene polymer having a molecular weight of between about 500 and 4000 and a substantial molar amount of reactive groups and possesses a viscosity below about 10,000 centipoises at a temperature within the range of approximately 100–120° F., and about 20–150 parts by weight of the polymer of an oil soluble diene-polymer-reactive heat-curing aldehyde resin; said unifying composition being heat curable within about four minutes at no more than about 350° F.; and heating said sheet for a total period of less than about four minutes first to an initial temperature of above 100° F. and then, to an elevated temperature in the neighborhood of 350° F. or above to remove any solvent therefrom and cause said unifying composition first to increase in fluidity and flow into the remaining interstices of the sheet so as to become substantially uniformly dispersed throughout said interstices and, then, to cure quickly in bonding relation with the fibers of the sheet.

2. The method of unifying a bibulous paper sheet according to claim 1, wherein said diene polymer has an average of about one-half to two and one-half hydroxyl or carboxyl reactive groups per mol.

References Cited

UNITED STATES PATENTS

| 2,253,922 | 8/1941 | Van Cleef | 117—68.5 |
| 2,954,868 | 10/1960 | Swedish et al. | 117—122 X |
| 3,020,169 | 2/1962 | Phillips et al. | 117—68.5 X |
| 3,036,927 | 5/1962 | Jerothe | 117—65.2 X |
| 3,066,043 | 11/1962 | Hechtman et al. | 117—68.5 |
| 3,068,117 | 12/1962 | Korpman | 117—122 X |
| 3,133,825 | 5/1964 | Rubens | 117—155 X |

WILLIAM D. MARTIN, Primary Examiner

B. D. PIANALTO, Assistant Examiner

U.S. Cl. X.R.

117—68.5, 76, 122, 155